United States Patent [19]

Rieppel et al.

[11] 4,423,301

[45] Dec. 27, 1983

[54] AIR-CARBON ARC CUTTING AND GOUGING

[75] Inventors: Perry J. Rieppel, Worthington; Raymond A. Sadauskas, Columbus, both of Ohio

[73] Assignee: Arcair Company, Lancaster, Ohio

[21] Appl. No.: 382,443

[22] Filed: May 26, 1982

Related U.S. Application Data

[63] Continuation of Ser. No. 172,795, Jul. 8, 1980, abandoned, which is a continuation of Ser. No. 848,817, Nov. 7, 1977, abandoned.

[51] Int. Cl.$^3$ ................................................ B23P 1/06
[52] U.S. Cl. ................................. 219/68; 219/145.21; 252/506; 252/509
[58] Field of Search ............... 252/506, 507, 508, 509; 219/68, 70, 146.21, 145.21

[56] References Cited

U.S. PATENT DOCUMENTS 421,469  2/1890  Adeney ........................... 252/507 X
2,706,236  4/1955  Stepath .

OTHER PUBLICATIONS

Welding Handbook, 6th Edition, Section 3, Part A Welding, Cutting and Related Processes A.W.S., New York, N.Y., 1970, p. 43.14.

Primary Examiner—B. A. Reynolds
Assistant Examiner—Geoff Evans
Attorney, Agent, or Firm—James C. Simmons; E. Eugene Innis

[57] ABSTRACT

Addition of between 2 and 20% by weight of noise suppressing constituents to a conventional d.c. air-carbon arc cutting and gouging electrode results in an electrode operating at noise levels between 5 and 15 dbA below that of a conventional d.c. electrode. Further noise reduction is achieved by lowering the operating pressure of the air in the torch.

1 Claim, 1 Drawing Figure

A-1/2" DIA. CONVENTIONAL CARBON ELECTRODE
B-1/4" DIA.  "            "            "            "
C-1/2" DIA. CARBON ELECTRODE WITH ADDITION OF NOISE SUPPRESSENT
D-1/4" DIA.  "            "            "            "            "            "            "

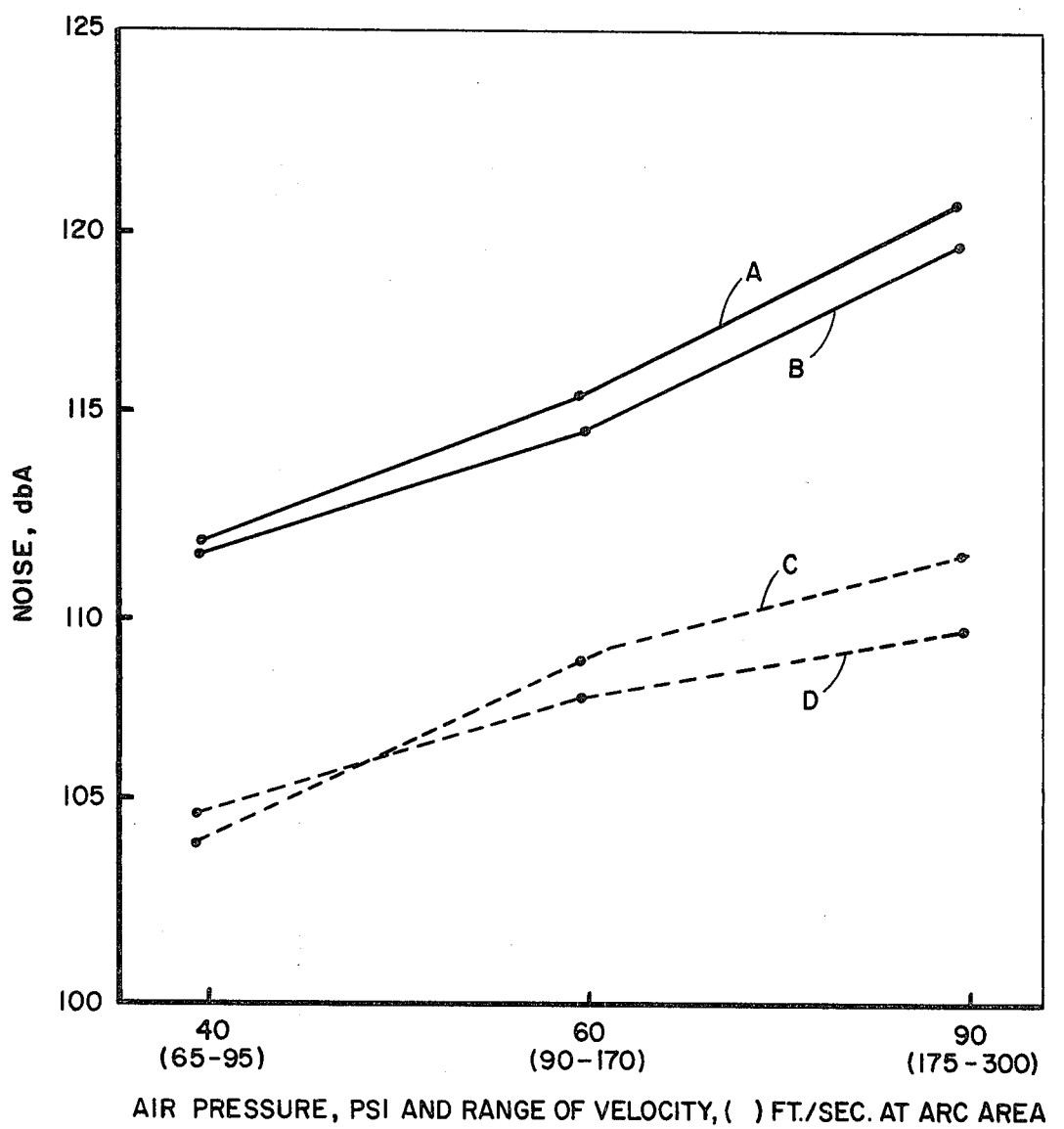
AIR PRESSURE, PSI AND RANGE OF VELOCITY, ( ) FT./SEC. AT ARC AREA
A - 1/2" DIA. CONVENTIONAL CARBON ELECTRODE
B - 1/4" DIA.      "              "         "
C - 1/2" DIA. CARBON ELECTRODE WITH ADDITION OF NOISE SUPPRESSENT
D - 1/4" DIA.    "         "      "     "      "   "      "

AIR-CARBON ARC CUTTING AND GOUGING

This is a continuation of application Ser. No. 172,795 filed July 28, 1980, now abandoned, which is a continuation of application Ser. No. 848,817, filed Nov. 7, 1977 and also now abandoned.

BACKGROUND OF THE INVENTION

1. Field of the Invention

This invention pertains to electrodes for use in the air-carbon arc cutting and gouging process used in industry for cutting, cleaning, or preparing metals for subsequent fabrication operations. In the hands of a skilled operator, a ferrous material, e.g. steel plate, can be provided with a groove which can subsequently be filled with a weld metal deposit to effect a repair or facilitate a subsequent fabrication operation. The process can be automated and controlled to such a degree that grooves are provided or cuts made in metals that approach those machined or cut by conventional machine tools.

2. Description of the Prior Art

The air-carbon arc cutting and gouging process was first described in U.S. Pat. No. 2,706,236. According to the process as now practiced, a carbon (graphite) electrode, normally having a copper coating, is positioned so that an arc can be struck between the electrode and a work piece. At the same time the arc is initiated, compressed air is caused to flow down the side of the electrode following the direction of travel to forceably remove (blast away) molten metal produced by the effect of the electric arc.

Electrodes suitable for use in the air-carbon arc cutting and gouging process are discussed in detail in U.S. Pat. Nos. 3,030,544; 3,131,290; 3,566,069; 3,633,063; and 3,796,853. In all of the prior patents the conventional electrode for use in direct current (d.c. operation) is manufactured from a mixture of carbonaceous materials such as graphite, carbon black, a binder such as tar and pitch and if necessary, a lubricant. The mixture is mixed at an elevated temperature by a kneading technique and extruded to a finished cross-sectional shape which is then cut to length and baked at elevated temperature to provide a finished electrode substrate for use in the process. The finished electrode substrate is subjected to further surface finishing operations and then is provided with a copper coating to enhance conductivity when the electrode is used in a cutting or gouging operation.

Plain carbon or graphite electrodes have been used with alternating current (a.c.) power supplies in a conventional air-carbon arc cutting and gouging process. However, when such electrodes are used with an alternating current power supply the arc stability is very poor. Therefore, arc stabilizers such as mixtures of rare earth oxides have been used in the past to stabilize the arc. The conventional a.c. electrode is not satisfactory for d.c. operation and generally contains in excess of 30% by weight arc stabilizers. Conventional d.c. (plain carbon) air-carbon arc cutting and gouging electrodes operate at noise levels of between 120 to 120 dbA in normal use.

SUMMARY OF THE INVENTION

In order to reduce the operating noise level of the air-carbon arc cutting and gouging process, extensive studies of the basic process were undertaken including high-speed moving pictures (1400 frames/sec) of the gouging arc. These studies revealed that as the air flows between the electrode and the work piece being gouged or cut the arc column is physically moved very rapidly from one position to another in the arc gap between the electrode end and the arc pool of the work piece. It also changes in length very rapidly as it moved about. In some cases the current path of the arc is broken for a very small fraction of a second. The very rapid motion of the arc column, with its changes in length while traveling from one spot and re-establishment in another and the breaks and re-establishment of the arc occur continuously throughout the gouging or cutting process. Experimental evidence led to the conclusion that these rapid changes in the arc produce excessive noise in the air-carbon arc cutting and gouging process.

It was discovered by use of high-speed photography and other means that by supplying materials to the arc that ionize easily, the arc column moves about with a steady motion and will re-establish with greater ease from point to point in the electrode-arc pool relationship and thus the operating noise level of the process will be reduced.

The increase in ionization in the arc can be obtained by providing between 2 and 20% by weight of a thermionic emitter, rare earth compound or alkali earth compounds which constituents are, for the purpose of this invention, generically called noise suppressants or noise suppressing constituents. Using noise suppressants overall operating noise level of the process, without further corrections to the process, can be reduced between 5 and 12 dbA. The noise suppressing constituent ionizes in the arc and provides a highly conductive path for the current thus promoting a smooth arc and less noise.

Electrodes according to the present invention operate equally with both alternating and direct current power supplies thus reducing the necessity for inventorying two types of electrodes for use in the air-carbon arc cutting and gouging process.

Further reductions in the operating noise presented to the user's ear can be effected by, in combination with the electrodes according to the present invention, reducing the pressure inside of the torch head and thus the velocity of air impinging on the gouging-arc area.

Therefore, it is the primary object of this invention to provide an improved air-carbon arc cutting and gouging electrode.

It is another object of the present invention to provide an air-carbon arc cutting and gouging electrode that provides significant reduction in the overall operating noise level of the conventional air-carbon arc cutting and gouging process.

It is yet another object of the present invention to provide a method for reducing the operating noise level of the conventional air-carbon arc cutting and gouging process.

It is still another object of the present invention to provide an improved air-carbon arc cutting and gouging electrode suitable for use with alternating current or direct current power supplies.

BRIEF DESCRIPTION OF THE DRAWING

The single FIGURE of the drawing is a plot of ambient noise level against torch head air pressure and flow velocity at the arc area for conventional electrodes and electrodes according the present invention suitable for use in the air-carbon arc cutting and gouging process.

DETAILED DESCRIPTION OF THE PREFERRED EMBODIMENT

Conventional round air-carbon arc cutting and gouging electrodes are described in U.S. Pat. No. 3,131,290, the specification of which is incorporated herein by reference. Additionally, the so-called flat electrodes have come into use with the air-carbon arc cutting and gouging process. These electrodes are disclosed in U.S. Pat. No. 3,566,069, the specification of which is made a part hereof by reference.

Conventional d.c. (direct current) air-carbon arc cutting and gouging electrodes are manufactured from a mixture of a carbonaceous material usually graphite with carbon black to fill in the voids and pores as the electrode is extruded, a binder such as tar or pitch or combinations thereof, and if necessary a lubricant such as a hydrocarbon acid. The mixture is kneaded at elevated temperature (e.g. plus 100° C.) and then extruded to shape. As the mix is extruded, the electrodes are cut to length and then given a bake or other thermal treatment to set the binder. After baking the electrodes may be machined to improve straightness for surface preparation, and, in the case of jointed electrodes such as shown in U.S. Pat. No. 3,131,290, provided with the necessary end configurations for continuous joined electrodes. Subsequently, the electrodes are covered with a metallic coating, usually copper, to increase the conductivity of the electrode.

Conventional d.c. electrodes operate with ambient noise levels of between 120 and 125 dbA in normal use. Such noise levels are deleterious in that prolonged exposure by an operator to noise at this intensity can cause permanent ear damage.

Observations have led to the conclusions that the air blowing between the electrode and the work piece contributes to the arc being continuously in motion and sometimes to have the current path broken for very small time intervals. The arc re-establishes itself very rapidly as it moves from spot to spot and the process of motion and perhaps extinction and re-establishment continues throughout the gouging process thus producing the high noise levels.

It was discovered that providing a material in the electrode that ionizes and provides a highly ionized arc atmosphere and thus a good conducting path and a smoother arc action reduced the operating noise level of the process between 5 and 15 dbA.

As will be set out hereinafter, a large number of materials which are generically called noise suppressing constituents (noise suppressants and/or arc stabilizers) have been tried. It is believed that the invention encompasses all such materials that either act as thermionic emitters, and/or are rare earth compounds and alkali earth compounds that will be effective to reduce the operating noise level caused by the arc length changes, motion and break phenomena. The more desirable materials to produce electrodes that are structurally sound at normal operating temperatures should also have a high or very high melting temperature, e.g. above 110° C.

Electrodes according to the present invention would have a nominal composition as set out in Table I:

TABLE I

| NOMINAL ELECTRODE COMPOSITION | |
| --- | --- |
| Graphite | 59.1% by weight |
| Carbon Black | 6.8% by weight |
| Noise Suppressant | 8.6% by weight |
| Binder | 24.6% by weight |
| Lubricant | 0.9% by weight |

From the foregoing table the graphite material is taken to mean new graphite, semi-graphite, scrap from furnace electrode turnings or scrap air-carbon arc cutting and gouging electrodes, graphite flour, or synthetic graphite. The carbon black is a material well known and readily available in the marketplace. The binder is preferably a coal tar pitch such as is available from suppliers of raw materials for fabrication of electrodes. The lubricant is an organic acid such as oleic acid.

Typical ranges of noise suppressants and/or arc stabilizers tried are set out in Table II:

TABLE II

| NOISE SUPPRESSANT | % by Wt. of Electrode |
| --- | --- |
| 1. Rare Earth Chiefly Cerium and Lanthanum | 1–15 |
| 2. Iron Oxide $Fe_3O_4$ | 15 |
| 3. Potassium Titanate | 5–15 |
| 4. Electrode Coating Mix (Nominal composition by weight % - 28.5 Feldspar; 20.1 Titanium Dioxide; 24.3 Potassium Titanate; 27.1 Rare Earth) | 5–15 |
| 5. 15% Rare Earth + 5% Ferroboron | 20 |
| 6. Zirconium Silicate | 3–10 |
| 7. Calcium Carbonate | 3–10 |
| 8. Feldspar | 5 |
| 9. Calcium Fluoride | 5–8 |
| 10. Iron Powder | 5 |
| 11. 15% Rare Earth + 5% Ferromanganese | 20 |
| 12. 3% Rare Earth + 3% Rutile | 6 |
| 13. Rutile | 3–8 |
| 14. 3% Rare Earth + 5% Calcium Fluoride | 8 |
| 15. 3% Rare Earth + 5% Calcium Carbonate | 8 |
| 16. Lime | 10 |

Using the foregoing information electrodes were prepared by mixing the materials as set out above, extruding the electrodes to finished diameters of ½ inch or ¼ inch, baking the electrodes and surface finishing the electrodes in a conventional manner for testing.

In formulating the compositions according to the present invention various materials were tried. The compounds were generally formulated from materials available as commercially pure. The Rutile was obtained from Chema-loy Company, Inc. of Bryn Mawr, Pa., as an Air Floated Rutile (Titanium ore).

The rare earth material is sold by W. R. Grace & Co., Davison Chemical Davision as a code 1420 rare earth. This material contains a total rare earth oxide of approximately 84% by weight with a minimum of 45% by weight cerium oxide measured against the total rare earth oxide present.

Set out in Table III are the results of a series of tests conducted with ½" diameter electrodes according to the present invention in an automatic air-carbon arc cutting and gouging torch.

TABLE III

| Noise Suppressant | Wt. % of mix | Power Supply Setting Amps | Power Supply Setting Volts | Noise (dbA) | Remarks[1] |
| --- | --- | --- | --- | --- | --- |
| Standard d.c. Electrode | 0% | 750 | 40 | 115–119 | O.K. |
| Rare Earth | 15% | 750 | 32 | 102–106 | O.K. |

TABLE III-continued

| Noise Suppressant | Wt. % of mix | Power Supply Setting Amps | Power Supply Setting Volts | Noise (dbA) | Remarks[1] |
|---|---|---|---|---|---|
| Rare Earth (R.E.) | 12% | 750 | 36 | 104–106 | O.K. |
| Rare Earth (R.E.) | 10% | 750 | 36 | 103–105 | O.K. |
| Rare Earth (R.E.) | 9% | 750 | 35 | 106–108 | O.K. |
| Rare Earth (R.E.) | 8% | 740 | 35 | 105–107 | Good |
| Rare Earth (R.E.) | 6% | 750 | 35 | 105–106 | O.K. |
| Rare Earth (R.E.) | 5% | 760 | 35 | 102–104 | Good |
| Rare Earth (R.E.) | 3% | 770 | 32 | 105–107 | O.K. |
| Rare Earth (R.E.) | 2% | 750 | 35 | 105–107 | Bad |
| Rare Earth (R.E.) | 1% | 750 | 36 | 109–111 | Bad |
| Potassium Titanate | 15% | 770 | 30 | 107–108 | Good (shallow) |
| Potassium Titanate | 10% | 750 | 32 | 103–105 | O.K. (shallow) |
| Potassium Titanate | 5% | 750 | 35 | 103–105 | O.K. |
| Weld Flux | 15% | 750 | 34 | 106–107 | Ragged-shallow |
| Weld Flux | 10% | 760 | 32 | 105–107 | O.K. |
| Weld Flux | 5% | 740 | 40 | 107–109 | O.K. |
| Zircon Silicate | 10% | 750 | 40 | 117–120 | O.K. |
| Zircon Silicate | 3% | 750 | 32 | 108–111 | Deposits in Groove |
| Calcium Fluoride | 8% | 750 | 35 | 110–113 | Good (shallow) |
| Calcium Fluoride | 5% | 770 | 32 | 108–109 | O.K. (shallow) |
| Calcium Carbonate | 10% | 750 | 32 | 103–105 | Good (shallow) |
| Calcium Carbonate | 5% | 750 | 35 | 105–106 | Good (shallow) |
| TiO$_2$ | 8% | 750 | 34 | 116–118 | Good (wide) |
| TiO$_2$ | 3% | 750 | 35 | 106–108 | Good |
| Iron Powder | 5% | 760 | 32 | 105–107 | Good |
| Welding Rutile | 15% | 750 | 34 | 110–112 | Good |
| Welding Rutile | 3% | 750 | 36 | 110–112 | O.K. (wide) |
| Iron Oxide | 15% | 750 | 33 | 107–108 | Bad |
| Feldspar | 5% | 750 | 36 | 105–106 | O.K. (shallow) |
| Lime | 10% | 750 | 28 | 104–106 | Good (shallow) |
| R.E. & Ferro Boron | 15 + 5 | 780 | 30 | 104–107 | Good |
| R.E. & TiO$_2$ | 3 + 3 | 750 | 34 | 104–105 | Good |
| R.E. & Ferro Manganese | 15 + 5 | 760 | 32 | 104–106 | Good |
| R.E. & Calcium Fluoride | 3 + 5 | 750 | 34 | 107–109 | O.K. (shallow) |
| R.E. & Calcium Carbonate | 3 + 5 | 750 | 32 | 106–108 | O.K. |
| R.E. & Rutile | 11 + 4 | | | | |
| R.E. & Rutile | 7.5 + 7.5 | 750 | 35 | 105[2] | Good |
| R.E. & Rutile | 4 + 11 | | | | |

NOTES:
ARCAIR N-5 Automatic Air-Carbon Arc Cutting and Gouging Torch. The air velocity at the arc area was between 95 and 160 ft./sec. Travel speed 25" per minute. TekTran LSC-1000 Power Supply. GR-1933 or Scott 452 Sound Level Meter with microphones 20" away from the arc and perpendicular to direction of gouging. All data taken in anechoic chamber.
[1] Good - groove very smooth.
OK - groove is average and slag removal is easy.
Bad - groove ripples, deposits, rough, poor looking groove.
[2] Average readings.

From the results reported in the foregoing Table it is apparent that significant reduction in the operating noise level of a conventional air-carbon arc cutting and gouging process employing an automatic torch can be achieved by adding noise suppressants to the electrodes. While in each and every case the noise suppressant achieved its intended function not all noise suppressants resulted in grooves that are to be expected with a conventional automatic air-carbon arc cutting and gouging torch. However, the foregoing tests do establish the fact that the noise suppressant does in fact reduce the operating noise level of the process.

Identical experiments were carried out with a manual air-carbon arc cutting and gouging torch using the ½" diameter experimental electrodes and the results are set forth in Table IV below.

TABLE IV

| Noise Suppressant | Wt % of mix | Air psi | Noise (dbA) | Air psi | Noise (dbA) | Remarks |
|---|---|---|---|---|---|---|
| Standard DC | 0% | 90 | 120–123 | 40 | 115–117 | Poor groove at 40 psi |
| Rare Earth (R.E.) | 15% | | | 60 | 106–108 | O.K. |
| Rare Earth (R.E.) | 15% | 90 | 111–114 | 40 | 105–107 | O.K. |
| Rare Earth (R.E.) | 10% | | | 60 | 106–108 | O.K. |
| Rare Earth (R.E.) | 10% | 80 | 116–118 | 20 | 105–107 | O.K. |
| Rare Earth (R.E.) | 9% | 90 | 111–113 | 40 | 105–107 | O.K. |
| Rare Earth (R.E.) | 8% | | | 60 | 107–109 | O.K. |
| Rare Earth (R.E.) | 8% | 80 | 114–116 | 20 | 103–105 | O.K. |
| Rare Earth (R.E.) | 5% | 80 | 114–116 | 20 | 105–107 | O.K. |
| Rare Earth (R.E.) | 3% | 80 | 116–118 | 30 | 110–112 | O.K. |
| Rare Earth (R.E.) | 2% | | | 25 | 109–112 | Hard to use |
| Rare Earth (R.E.) | 1% | | | 25 | 109–111 | |
| Potassium Titanate | 15% | | | 25 | 104–106 | O.K. |
| Potassium Titanate | 10% | 90 | 114–116 | 30 | 108–110 | O.K. |
| Potassium Titanate | 5% | 80 | 116–118 | 20 | 106–108 | Hard to run |
| Welding Flux | 15% | | | 25 | 105–107 | O.K. |
| Welding Flux | 10% | 90 | 110–112 | 30 | 105–108 | O.K. |
| Welding Flux | 5% | 80 | 115–117 | 20 | 104–106 | O.K. |
| Zircon Silicate | 10% | | | 60 | 110–112 | — |
| Zircon Silicate | 10% | 90 | 116–119 | 40 | 111–115 | O.K. - but |

TABLE IV-continued

| Noise Suppressant | Wt % of mix | Air psi | Noise (dbA) | Air psi | Noise (dbA) | Remarks |
|---|---|---|---|---|---|---|
| Zircon Silicate | 3% | 80 | 116–118 | 30 | 107–110 | hard to use O.K. - but hard to use |
| Calcium Fluoride | 8% | 90 | 114–116 | 40 | 105–107 | O.K. |
|  | 5% | 80 | 116–118 | 30 | 108–110 | Did not work well at low pres. |
| TiO$_2$ | 8% | 90 | 114–116 | 40 | 106–108 | O.K. |
| TiO$_2$ | 3% | 80 | 116–118 | 20 | 107–109 | O.K. |
| Calcium Carbonate | 10% |  |  | 60 | 108–110 | — |
|  | 10% | 90 | 110–113 | 40 | 106–109 | O.K. |
|  | 5% | 80 | 115–117 | 20 | 105–107 | O.K. |
| Rutile | 3% | 80 | 116–118 | 20 | 107–109 | O.K. |
| Iron Oxide | 15% |  |  | 25 | 111–113 | Hard to maintain arc |
| Feldspar | 5% | 80 | 119–121 | 20 | 105–107 | O.K. |
| Iron Powder | 5% | 80 | 115–117 | 30 | 110–112 | O.K. |
| Lime | 10% | 90 | 113–116 | 40 | 108–110 | Hard to use - would not run well |
| R.E. & Ferro Boron | 15 + 5 |  |  | 25 | 103–105 | O.K. |
| R.E. & TiO$_2$ |  |  |  | 60 | 106–108 | — |
| R.E. & TiO$_2$ | 3 + 3 |  |  | 40 | 103–105 | O.K. |
| R.E. & Ferro Manganese | 15 + 5 |  |  | 30 | 104–107 | O.K. |
| R.E. & Ferro Fluoride | 3 + 5 | 90 | 113–115 | 40 | 105–107 | O.K. |
| R.E. & Calcium Carbonate | 3 + 5 |  |  | 60 | 106–108 | — |
|  | 3 + 5 | 90 | 113–115 | 40 | 105–107 | O.K. |

Notes:
ARCAIR K-5 Model Hand Held Torch used with Miller 600 DC Welder with avg. output of 750 amps & 30–35 volts. GR 1933 sound level meter. Microphone placed 20" away and above arc.

It should be noted that changes in the operating noise level effected by reducing air pressure in the torch are significant only if the same torch is used for both tests. A direct relationship between velocity of air impinging on the arc area and operating noise level exists regardless of the torch type.

In the case of the hand held torch, tests were run at two levels of air pressure inside the torch head, (i.e. generally high and low) to determine the effect of reduced air pressure on the operating noise level of the process. These data show variations of high pressure and variations in low pressure. The remarks section of Table IV bear the same interpretation used in reading the remarks section of Table III. Pressure is significant as long as the same type torch and electrode stick-out was used. Otherwise the relationship that is important is that noise level changes directly with changes in velocity of air impinging on the arc area. This information is summarized in a graph shown in FIG. 1. This shows the individual and combined effects of noise suppressants and reduction in velocity of air in the arc area.

From the data of the foregoing Table IV it is apparent that when electrodes according to the present invention are used in a hand held torch at high pressure there is a significant reduction in the operating noise level of the process. Again, as with the tests of Table III not every additive produced grooves that would be acceptable to the production user. However, the additives did demonstrate the inventive compositions and methods of reducing operating noise level of the conventional air-carbon arc cutting and gouging process.

The results of Table IV also demonstrate further reductions in the operating noise level of the conventional air-carbon arc cutting and gouging process can be achieved by reducing the torch head pressure. As can be seen from the table, at low pressure certain electrodes, notably among them the standard d.c. electrode provided poor results.

Some general observations made during the testing indicate that some of the noise suppressants (arc stabilizers) appear to make the slag more fluid, thus making slag removal easier and at the same time serve to reduce the overall operating noise level of the process. In comparing the results of both tables it was found that some of the electrodes that work well with the automatic torch did not work as well with a manual torch. This can possibly be explained by postulating that some of the arc stabilizers require constant corrections of the arc length and speed which occurs automatically in the automatic torch. In this respect it has been observed tha changes in arc length cause a change in arc voltage which sometimes produces less noise at the lowest possible operating voltage.

Lastly, some stabilized electrodes, notably those using potassium titanate or calcium carbonate, resulted in shallow grooves as compared to the groove made with a d.c. electrode used in the automatic torch, thus the metal removal rate of these two electrodes is poorer than the conventional electrode.

Further tests were conducted using a hand torch operated at 40 psi and 60 psi air pressure respectively. The torch employed was an Arcair Model K5 Torch used with either a Tektran LSC 1000 power supply or any one of model 500, 600 and 1,500 Miller Power Supplies. The data recording equipment included a general radio 1933 sound level meter, Heath VTVM, and Heath strip chart recorder together with volt and ammeters.

Fourteen types of electrodes, each having a different composition, were selected from a group of experimental stabilized electrodes and tested for noise reduction.

All the test electrodes were either ½ inch or 1/4 inch in diameter.

The highest possible score for any electrode in any of these tests is 60.

TABLE V

SUMMARY OF HAND TORCH DATA SHEETS AT 40 PSI

| | ¼" ELECTRODES | | | | ½" ELECTRODES | | | | | |
|---|---|---|---|---|---|---|---|---|---|---|
| | POINTS | | NOISE (dbA) | | POINTS | | NOISE (dbA) | | POINT | |
| DESCRIPTION | ON d.c. | ON a.c. | ON d.c. | ON a.c. | ON d.c. | ON a.c. | ON d.c. | ON a.c. | TOTAL | RANK |
| 5% Rare Earth[1] | 28 | 30 | 107.5 | 105.8 | 54 | 30 | 107.9 | 106.9 | 142 | 6 |
| 8% R.E. | 45 | 20 | 105.9 | 106.1 | 36 | 33 | 108.9 | 106.4 | 134 | 7 |
| 9% R.E. | 42 | 9 | 107.2 | 104.5 | 44 | 37 | 107.6 | 107.0 | 132 | 8 |
| 10% R.E. | 49 | 15 | 105.8 | 105.6 | 54 | 32 | 109.7 | 106.9 | 150 | 4 |
| 15% R.E. | 31 | 24 | 106.0 | 105.8 | 60 | 47 | 107.75 | 105.8 | 162 | 1 |
| 8% TiO$_2$ | 39 | 16 | 105.9 | 105.8 | 46 | 25 | 109.0 | 106.5 | 126 | 11 |
| 8% Calc. Fluoride | 32 | 25 | 104.25 | 106.0 | 39 | 13 | 108.3 | 107.4 | 109 | 14 |
| 10% Calc. Carbonate | 48 | 35 | 108.0 | 107.1 | 37 | 35 | 106.9 | 108.0 | 155 | 3 |
| 10% Zirconium Silicate | 50 | 23 | 109.3 | 106.4 | 52 | 33 | 112.2 | 107.1 | 158 | 2 |
| 10% Lime | 5 | 20 | 106.16 | 107.0 | 7 | 47 | 106.62 | 106.1 | 79 | 15 |
| 10% Welding Elect. Flux | 41 | 19 | 104.6 | 104.8 | 27 | 38 | 106.75 | 107.6 | 125 | 12 |
| 10% Potassium Titanate | 35 | 32 | 105.9 | 104.4 | 30 | 33 | 106.4 | 108.2 | 130 | 10 |
| 3% R.E. & 3% TiO$_2$ | 46 | 25 | 105.0 | 106.0 | 42 | 18 | 107.2 | 105.7 | 131 | 9 |
| 3% R.E. & 5% Calc. Carb. | 35 | 18 | 105.2 | 105.7 | 48 | 48 | 108.1 | 107.8 | 149 | 5 |
| 3% R.E. & 5% Calc. Fluoride | 41 | 15 | 107.6 | 106.25 | 33 | 24 | 108.2 | 106.8 | 113 | 13 |
| Average | 38 | 22 | 106.3 | 105.8 | 41 | 32.9 | 108.1 | 106.9 | 133 | |

Notes:
Miller 600 power supply for ¼" d.c. 350 amps, 30–35 volts
Miller 500 power supply for ¼" a.c. 350 amps, 30–35 volts
Miller 1500 power supply for ½" d.c. 750 amps, 32–40 volts
2 Miller 500 power supply for ½" a.c. 750 amps, 35–40 volts
[1]Arc Strike and Stability of ¼" Electrode Poor Five skilled operators were selected to run identical electrodes under identical conditions. Each electrode was coded so that neither the operator nor the test observer knew which electrode was being tested. The operators were to rate each electrode either good, satisfactory or poor for arc strike, arc stability, slag removal, groove appearance, groove depth and shape and give an overall opinion of the rod (electrode). The ¼ inch diameter electrodes were tested at 350 amps a.c. and d.c. and the ½ inch diameter electrodes were tested at 750 amps a.c. and d.c. at an air flow of 40 psi. Each operator was permitted to adjust the power supply and air flow to make a given electrode perform to his satisfaction.

Set forth in Table V are the results of this evaluation. The points assigned for each electrode are based upon a grading system of assigning zero points for a poor rating, one point for a satisfactory rating and two points for a good rating by the individual operators. The points column represents the total for the five operators.

From the data accumulated and shown in Table V, the seven best electrode types were selected and subjected to a second test under the same conditions as the first test except that the torch pressure was 60 psi instead of 40 psi. In addition, conventional d.c. and a.c. electrodes supplied by the National Carbon Division of Union Carbide Corporation, were also tested in conjunction with the electrodes according to the present invention.

The point system was the same as used in the tests set out in Table V.

TABLE VI

SUMMARY OF HAND TORCH DATA SHEETS AT 60 PSI

| | ¼" ELECTRODES | | | | ½" ELECTRODES | | | | | |
|---|---|---|---|---|---|---|---|---|---|---|
| | POINTS | | NOISE (dbA) | | POINTS | | NOISE (dbA) | | TOTAL | |
| | ON d.c. | ON a.c. | ON d.c. | ON a.c. | ON d.c. | ON a.c. | ON d.c. | ON a.c. | POINTS | RANK |
| 8% Rare Earth | 45 | 46 | 107.2 | 105.6 | 47 | 42 | 108.1 | 108.3 | 180 | 1 |
| 10% Rare Earth | 33 | 21 | 107.5 | 105.3 | 42 | 31 | 107.2 | 109.0 | 127 | |
| 15% Rare Earth | 46 | 39 | 106.3 | 104.5 | 26 | 18 | 107.7 | 107.3 | 129 | |
| 10% Calcium Carbonate | 43 | 39 | 109.1 | 104.1 | 46 | 44 | 109.6 | 109.5 | 172 | 2 |
| 10% Zirc. Silicate | 46 | 19 | 112.1 | 108.0 | 54 | 34 | 111.5 | 107.6 | 153 | |
| 3% R.E. & 3% TiO$_2$ | 46 | 26 | 105.9 | 104.6 | 40 | 32 | 107.7 | 108.5 | 144 | 3 |
| 3% R.E. & 5% Calcium Carbonate | 33 | 27 | 107.0 | 105.1 | 41 | 29 | 107.6 | 108.8 | 130 | |
| Union Carbide (d.c.)[1] | 57 | 3 | 112.3 | 103.6 | 60 | 13 | 111.0 | 108.2 | 133 | |
| Union Carbide (a.c.)[2] | 15 | 37 | 105.0 | 103.8 | 10 | 33 | 108.3 | 108.1 | 95 | |
| Average of 7 experimental electrodes | 42 | 31 | 107.8 | 105.3 | 42 | 33 | 108.5 | 108.4 | 147 | |

[1]d.c. electrode on a.c. power has very poor arc stability. Low noise level is result of arc constantly going off. Peak levels recorded at 112–115 dbA.
[2]very poor performance on d.c. power.

From the foregoing data it is apparent that electrodes according to the present invention, provide significant reduction of the operating noise level at the higher air pressure. Furthermore, electrodes, according to the present invention, yield consistent results whether used on direct or alternating current machines.

Table VI shows that three electrodes selected as having the overall best combination of noise reduction and gouging performance were those containing 8% rare earth, 10% calcium carbonate and a mixture of 3% rare earth +3% titanium dioxide.

It is also apparent from tables V and VI that 40 psi is the minimum air pressure needed to cut or gouge (groove) using electrodes with the present day torches.

Gouging at 60 psi proceeds easier and increases the noise level approximately 2 dbA.

Table VII sets ot a comparison of metal removal between the Union Carbide, the three electrodes selected above, and a conventional Arcair d.c. carbon rod (electrode).

TABLE VII

| Electrode Type | Wt. of Elect. grams | Length of Elect. (in.) | AMP | VOLT | Gram of C Used | Inch of C Used | Lbs. of metal removed | Total Arc Time | Lbs. per Gram | Lbs. per Inch | Lbs. per min. arc time | Lbs. per 10" elect. |
|---|---|---|---|---|---|---|---|---|---|---|---|---|
| Union Carbide | 455.40 | 70.000 | 750 | 40 | 176.40 | 25.000 | 10.95 | 8.14 | .0620 | .4380 | 1.3452 | 4.3800 |
| 3% R.E. + 3% TiO$_2$ | 474.70 | 72.378 | 750 | 35 | 194.00 | 26.628 | 8.15 | 7.15 | .0420 | .30606 | 1.1398 | 3.0606 |
| 10% Calc. Carbonate | 389.60 | 62.000 | 750 | 35 | 141.90 | 18.25 | 5.95 | 5.81 | .0419 | .32602 | 1.0240 | 3.2602 |
| 8% R.E. | 472.90 | 75.251 | 750 | 35 | 211.95 | 38.500 | 9.75 | 8.65 | .0460 | .253 | 1.1271 | 2.5324 |
| ARCAIR Conventional d.c. Carbon Rod | 411.00 | 72.489 | 750 | 35 | 160.8 | 25.939 | 10.000 | 6.82 | .0621 | .38551 | 1.4662 | 3.8551 |

In the foregoing it is apparent that the conventional d.c. electrode, and in particular the Union Carbide d.c. electrode, provided better metal removal rates than the electrodes containing the noise suppressant and/or arc stabilizer.

Other commercially available rare earth oxides, and other materials known as thermionic emitter alone and in combination, would serve the same purpose.

Having thus described our invention, what we desire to be secured by Letters Patent of the United States is set forth in the pending claims.

What is claimed is:

1. A method of cutting or gouging a metallic workpiece by the air carbon-arc cutting and gouging process which comprises using as an electrode in the process an electrode formulated to operate at a noise level of at least 5 dbA less than that of a conventional air carbon-arc electrode and consisting essentially of:

at least 50% by weight finely divided carbonaceous material selected from the group consisting of graphite, semigraphite, graphite flour, synthetic graphite, carbon black and mixtures thereof;

an effective amount of a carbonaceous binder; and 3 to 15% by weight noise suppressant selected from the group consisting of a rare earth mixture containing mainly oxides of cerium and lanthanum said rare earth mixture containing a minimum of 80% by weight rare earth oxides having a minimum of 45% by weight cerium oxide and said rare earth mixture mixed with air floated rutile.

* * * * *